United States Patent

Reynolds et al.

[11] Patent Number: 5,855,458
[45] Date of Patent: Jan. 5, 1999

[54] ROTARY CUTTER

[75] Inventors: Paul Adrian Reynolds; Philip Halstead, both of Sheffield, Great Britain

[73] Assignee: Hydra Tools International PLC, Sheffield, England

[21] Appl. No.: 848,594

[22] Filed: Apr. 28, 1997

Related U.S. Application Data

[63] Continuation of Ser. No. 513,941, filed as PCT/GB94/00442, Mar. 8, 1993, abandoned.

[30] Foreign Application Priority Data

Mar. 9, 1993 [GB] United Kingdom .................. 9304839

[51] Int. Cl.⁶ ...................................................... B26D 1/12
[52] U.S. Cl. .................................. 407/54; 407/34; 407/53; 407/61; 408/230
[58] Field of Search .................................. 407/53, 54, 34, 407/56, 61, 63; 408/230

[56] References Cited

U.S. PATENT DOCUMENTS

| 2,129,417 | 9/1938 | Gase | 407/54 |
| 3,863,316 | 2/1975 | Yeo | 407/54 |
| 5,190,420 | 3/1993 | Kishimoto et al. | 407/54 |

*Primary Examiner*—Andrea L. Pitts
*Assistant Examiner*—Toan Le
*Attorney, Agent, or Firm*—Trexler, Bushnell, Giangiorgi & Blackstone, Ltd.

[57] ABSTRACT

A rotary cutter includes an elongate body portion, a shank provided at one end of the body portion; a cutting head provided at the other end of the body portion, the head being fluted in one direction only by at least one flute of relatively short length provided in the cutting head, the flute having same-hand cutting and fluting directions; a relief providing transition surface located at a trailing end, relative to the shank, of a cutting portion of the at least one flute; a first gash face extending inwardly from a terminal end of a leading part of the at least one flute; and the first gash face being extended by a contiguous, secondary gash face on a rear face of the at least one flute.

12 Claims, 4 Drawing Sheets

ROTARY CUTTER

This application is a continuing application based upon U.S. application Ser. No. 08/513,941, filed Feb. 2, 1996, now abandoned, which in turn is a National Stage application under 35 USC 371 claiming the benefit and priority with respect to PCT application No. PCT/GB94/00442, filed Mar. 8, 1994, and Great Britain application, Ser. No. 9304839.5, filed Mar. 9, 1993. Priority under the United States patent law is claimed with respect to the above-noted prior U.S. application and the PCT and United Kingdom applications under the provisions of 35 USC 119 and 35 USC 120

BACKGROUND

This invention relates to a rotary cutter particularly though not exclusively for ultra high speed use, typically at 10,000 to 30,000 r.p.m., principally for metal cutting, typically of light alloys, by so-called peck-feeding.

A known cutter for ultra high speed peck-feeding comprises an elongate body portion with a shank at one end adapted to be clamped in a chuck of a machine tool and with a cutting head at the other end provided with two flutes e.g. at 45° helix angle, and has relied on the basic geometry of an industry-standard slot drill. Such geometry was never intended for ultra high speed peck-feeding and results in both vibration and cutter distortion and also in a need for a finish machining operation to remove a visual defect that inevitably results.

SUMMARY

The object of the present invention is to provide a rotary cutter with revised geometry capable of satisfactory ultra high speed peck-feed cutting.

According to the present invention there is provided a rotary cutter comprising an elongate body portion, a shank provided at one end of said body portion; a cutting head provided at the other end of said body portion, said head being fluted in one direction only by at least one flute of relatively short length provided in said cutting head, said flute having same-hand cutting and fluting directions; a relief providing transition surface located at a trailing end, relative to said shank, of a cutting portion of said at least one flute; a first gash face extending inwardly from a terminal end of a leading part of said at least one flute; and said first gash face being extended by a contiguous, secondary gash face on a rear face of said at least one flute.

The cutter in accordance with the invention has been found in tests to be capable of highly efficient peck-feeding at ultra high speeds, in that considerably improved swarf ejection is achieved by the presence of the second gash faces, whilst the cutter has been found to be both vibration and distortion resistant, and furthermore produces no visual defect thereby totally avoiding the need for a second finish-machining step.

The transition surface could be a radius, or could be planar, e.g. a chamfer.

The cutter could be solid carbide, or could be in the form of a brazed tool with at least one helical carbide brazed to a steel shank, or could be of high speed steel.

The cutter could be provided with one, two, three or four flutes. Preferably, the cutter is coated, e.g. with titanium nitride, for extended tool life. A typical cutter has two 45° flutes, right hand spiral with right hand cutting, or left hand spiral left hand cutting.

BRIEF DESCRIPTION OF THE DRAWINGS

Cutters in accordance with the invention are shown in the accompanying drawings, in which.

In all embodiments, like reference numerals are employed for like parts.

DESCRIPTION

Figure 1:
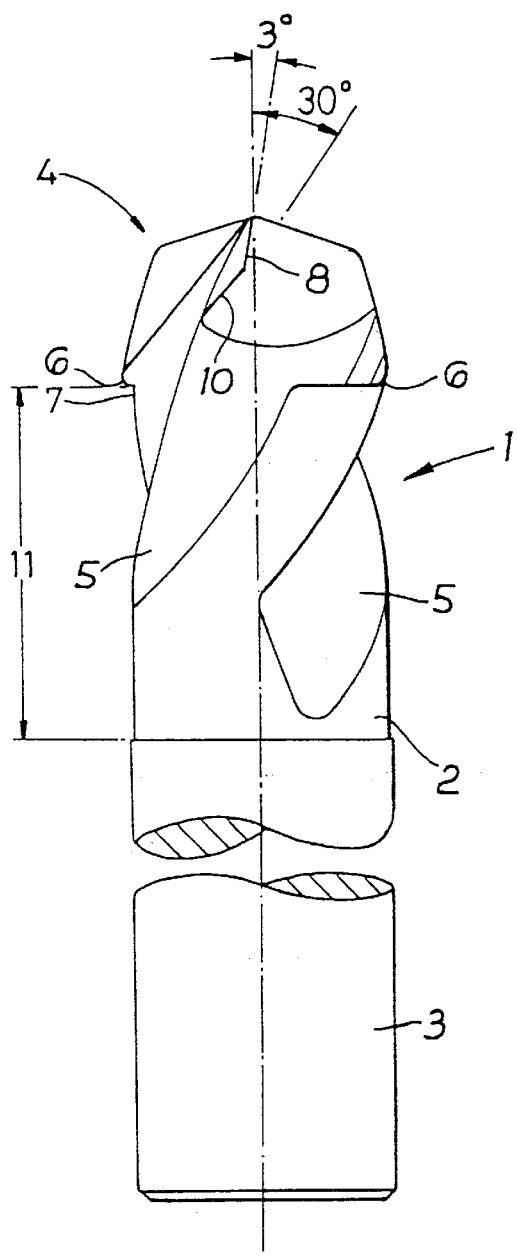
FIG. 1 is a side elevation of a first rotary cutter, of high speed steel, with right hand spiral, right hand cutting, in accordance with the invention.
Figure 2:
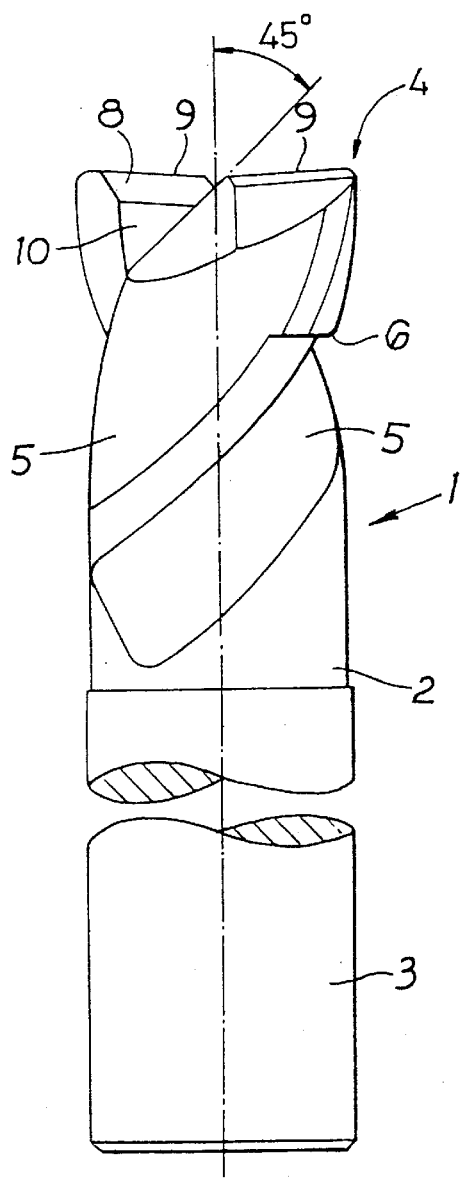
FIG. 2 corresponds to FIG. 1 but is 90° removed.
Figure 3:
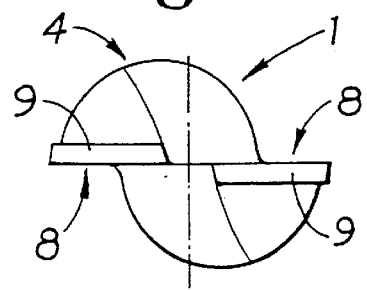
FIG. 3 is an end view on the cutting head of the cutter of FIGS. 1 and 2.
Figure 4:
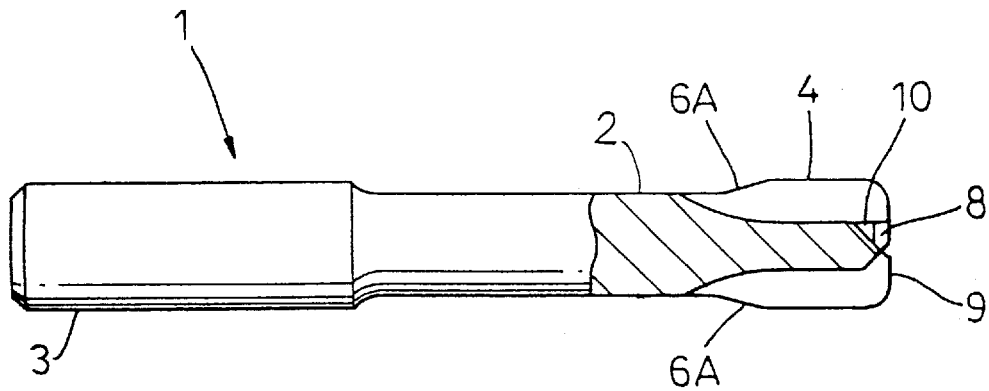
FIG. 4 is a side elevation of a second embodiment of rotary cutter, of solid carbide, in accordance with the invention.
Figure 5:
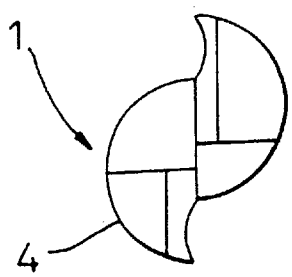
FIG. 5 is an end view of FIG. 4.
Figure 6:
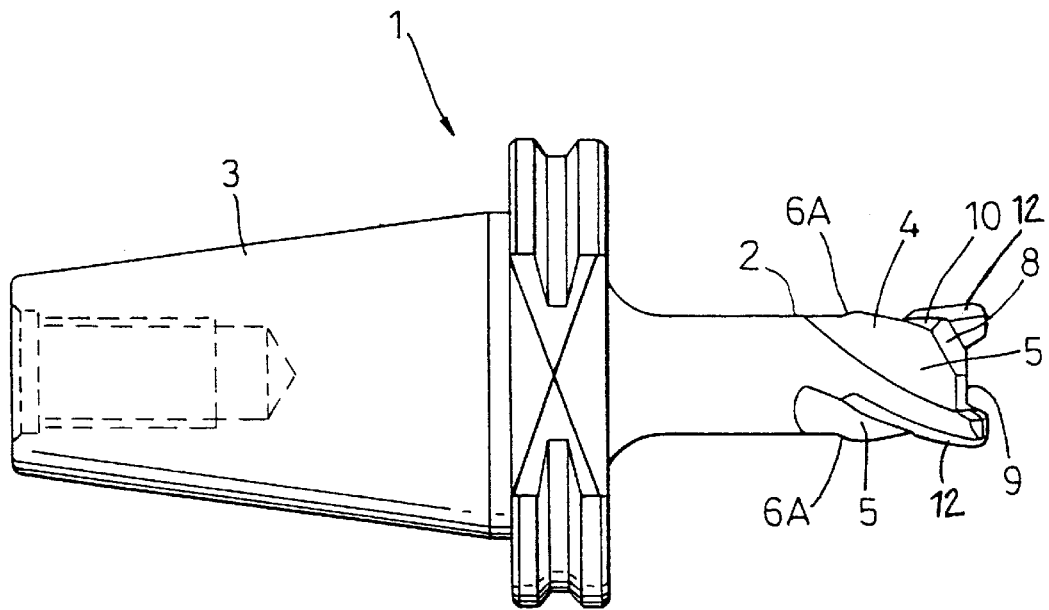
FIG. 6 is a side elevation of a third embodiment of rotary cutter, with carbide inserts, in accordance with the invention.
Figure 7:
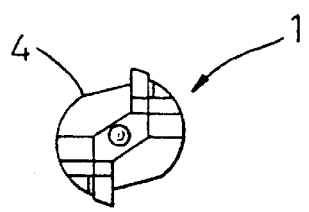
FIG. 7 is an end view of FIG. 6.
Figure 8:
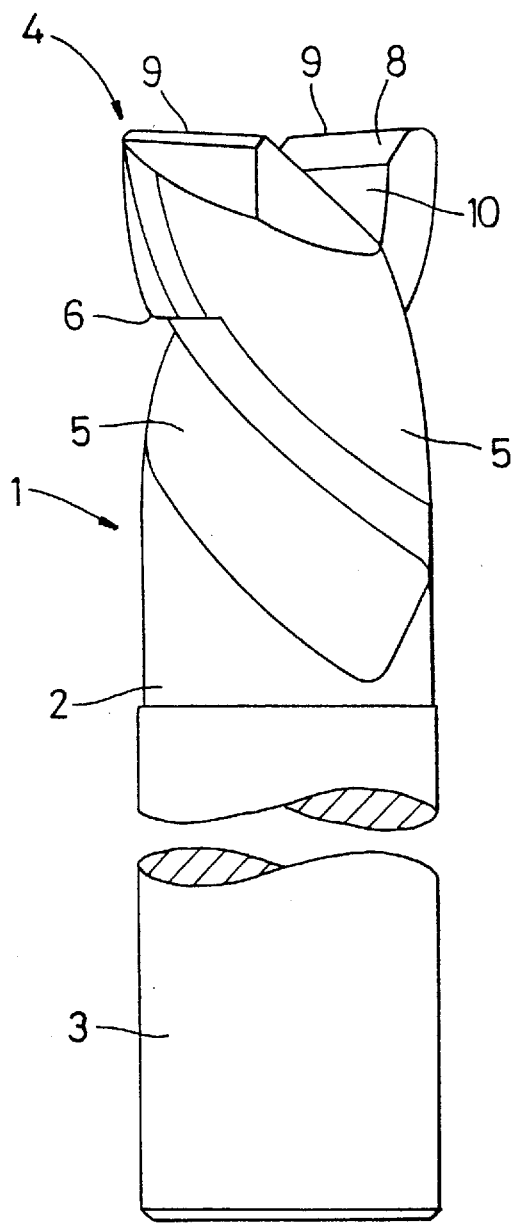
FIG. 8 corresponds to FIG. 2 but shows a left hand spiral, left hand cutting tool.

A rotary cutter 1 comprising an elongate body portion 2 having at one end a shank 3 adapted to be secured, e.g. in a chuck of a machine tool, and at the other end a multi-fluted cutting head 4. Two 45° flutes 5 of relatively short length are provided in the head 4, while, in FIGS. 1–3, a relief providing transition radius 6 is located at the trailing end 7 of the cutting portion of each flute 5, and in FIGS. 4 and 5, and in FIGS. 6 and 7, a chamfer 6A to achieve the same, relief-providing effect over axial length 11 from the radius 6 (or chamfer 6A) to the shank 3, to ensure that the length 11 has clearance from the hole produced in the workpiece by the head 4, whereby the need for a second, finishing operation is obviated. In addition, a first gash face 8, e.g. at 3° extends axially inwardly from a terminal end 9 of each flute 5 and each first gash face 8 is extended by a contiguous, secondary gash 10 on the rear face of each flute 5, at 30° (cut through at 45°) and is a compromise to blend the 3° primary gash spiral flute because the 45° spiral flute is only true at the periphery of the cutter. The secondary gash 10 serves the purpose of removing material that would otherwise inhibit the free flow of swarf enabling the cutter to be operated at the high rotation speeds e.g. 30,000 rpm, required. In the embodiment illustrated in FIGS. 6 and 7, two helical carbide inserts 12 are provided brazed to the steel shank 3, 180° apart.

What is claimed is:

1. A rotary cutter comprising an elongate body portion, a shank provided at one end of said body portion; a cutting head provided at the other end of said body portion, said head being fluted in one direction only by at least one flute of relatively short length provided in said cutting head, said flute having same-hand cutting and fluting directions; a relief providing transition surface located at a trailing end, relative to said shank, of a cutting portion of said at least one flute; a first gash face extending inwardly from a terminal end of a leading part of said at least one flute; and said first gash face being extended by a contiguous, secondary gash face on a rear face of said at least one flute.

2. A cutter as claimed in claim 1, wherein said transition surface is a radius.

3. A cutter as claimed in claim 1, wherein said transition surface is a chamfer.

4. A cutter as claimed in claim 1, wherein said first gash face is at 3° with respect to the axis of rotation of the cutter.

5. A cutter as claimed in claim 1, wherein said second gash face is at 30° with respect to the axis of rotation of the cutter, cut through at 45° with respect to the axis of rotation of the cutter.

6. A cutter as claimed in claim 1 of solid carbide.

7. A cutter as claimed in claim 1 in the form of at least one helical carbide insert brazed to a steel shank.

8. A cutter as claimed in claim 1 of high speed steel.

9. A cutter as claimed in claim 1, provided with two said flutes 180° apart.

10. A cutter as claimed in claim 1 having an external coating for extended tool life.

11. A cutter as claimed in claim 1 having two 45° flutes with respect to the axis of rotation of the cutter, right hand spiral and right hand cutting.

12. A cutter as claimed in claim 1 having two 45° flutes with respect to the axis of rotation of the cutter, left hand spiral and left hand cutting.

* * * * *